United States Patent
Hwang et al.

(10) Patent No.: US 8,073,604 B2
(45) Date of Patent: Dec. 6, 2011

(54) METHOD AND SYSTEM FOR PROTECTING A STARTING CLUTCH

(75) Inventors: Donghwan Hwang, Seoul (KR); Youngmin Yoon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 437 days.

(21) Appl. No.: 12/323,426

(22) Filed: Nov. 25, 2008

(65) Prior Publication Data

US 2009/0276129 A1    Nov. 5, 2009

(30) Foreign Application Priority Data

Apr. 30, 2008   (KR) .................. 10-2008-0040816

(51) Int. Cl.
   *G06F 17/00*   (2006.01)
(52) U.S. Cl. ................ 701/67; 477/72; 701/84
(58) Field of Classification Search ............ 701/67, 701/68, 84; 477/76, 176, 98, 174, 180, 97, 477/70
   See application file for complete search history.

(56) References Cited

U.S. PATENT DOCUMENTS

| | | | | |
|---|---|---|---|---|
| 4,576,263 A | * | 3/1986 | Lane et al. ............... | 477/72 |
| 6,341,679 B1 | * | 1/2002 | Abe et al. ............... | 192/3.29 |
| 6,482,123 B2 | * | 11/2002 | Steeby ............... | 477/98 |
| 6,922,623 B2 | * | 7/2005 | Rieger et al. ............... | 701/67 |
| 7,077,783 B2 | * | 7/2006 | Senger et al. ............... | 477/98 |
| 7,207,922 B2 | | 4/2007 | Kuhstrebe et al. | |
| 7,874,406 B2 | * | 1/2011 | Phillips et al. ............ | 188/264 D |
| 2003/0022759 A1 | * | 1/2003 | Frotscher ............... | 477/174 |
| 2007/0214905 A1 | * | 9/2007 | Gierling et al. ............ | 74/336 R |

FOREIGN PATENT DOCUMENTS

| | | |
|---|---|---|
| JP | 7-71492 A | 3/1995 |
| JP | 8-230503 A | 9/1996 |
| JP | 2003-327000 A | 11/2003 |
| JP | 2005-337416 A | 12/2005 |

* cited by examiner

*Primary Examiner* — Thomas G. Black
*Assistant Examiner* — Marthe Marc-Coleman
(74) *Attorney, Agent, or Firm* — Morgan, Lewis & Bockius LLP

(57) ABSTRACT

A method protects a starting clutch. The method generates an estimated equivalent temperature of the starting clutch and performs an operation for protecting the starting clutch if the estimated temperature exceeds critical temperature, in order to prevent the burnout of the starting clutch caused by excessive slip under severe conditions. A system implementing the method is also described.

12 Claims, 2 Drawing Sheets

METHOD AND SYSTEM FOR PROTECTING A STARTING CLUTCH

CROSS-REFERENCE TO RELATED APPLICATION

The present application is based on and claims priority from Korean Patent Application Number 10-2008-0040816 filed Apr. 30, 2008, the entire contents of which application is incorporated herein for all purposes by this reference.

BACKGROUND OF THE INVENTION

1. Field of the Invention

The present invention relates to a method and system for protecting a starting clutch, and more particularly, to a method and system that provides an estimated temperature for the starting clutch and performs operations for protecting the starting clutch if the estimated temperature exceeds the critical temperature of the clutch.

2. Description of Related Art

In an automatic transmission vehicle, the temperature of a clutch used to control a transmission member generally corresponds to the maximum frictional heat energy of a friction member. In this case, the maximum frictional energy of the friction member is calculated using the maximum transmission torque, relative revolutions per minute (RPM) of components, and transmission time of the control of oil pressure. Further, a generally conventional clutch protecting logic controls the thickness of the friction member plate in order to ensure the clutch so that the temperature calculated from the maximum frictional heat energy of the friction member, which may be generated during the transmission, does not exceed critical temperature of the clutch. Accordingly, the clutch protecting logic generally protects the clutch.

Meanwhile, in an automatic transmission vehicle provided with a starting clutch, the temperature of the starting clutch is sensed by a temperature sensor that senses the temperature of oil dispersed through a friction member plate. If the temperature sensed by the temperature sensor exceeds critical temperature, the starting clutch is protected by conventional clutch protecting logic. However, when the temperature of the starting clutch is sensed using the temperature sensor, the amount of oil flowing on the friction surface of the starting clutch is not sufficient during the slip or locking of the starting clutch. For this reason, it is difficult to effectively sense the temperature of the starting clutch. Further, conventional clutch protecting logic generally only protects the clutch by using the maximum frictional heat energy generated during one time of transmission. Since the starting clutch has characteristic of continuous or repeated slip, cumulative temperature should be detected. However, since the cooling corresponding to the characteristic of the starting clutch is not considered in conventional clutch protecting logic, conventional clutch protecting logic cannot effectively calculate the temperature of the starting clutch. Accordingly, there is a problem in that it is difficult to protect the starting clutch. For this reason, there has not been proposed a starting clutch protecting logic based on the temperature corresponding to the characteristic of the starting clutch.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention provide for a method and system of protecting a starting clutch that generates an estimated temperature of a starting clutch in consideration of its cooling properties and performs operations for protecting the starting clutch when the estimated temperature exceeds a predetermined critical temperature. In this manner, the method and system of the present invention prevents burnout of the starting clutch caused by excessive slip under severe conditions.

One aspect of the present invention is directed to a method of protecting a starting clutch of a vehicle, the method including a first step of calculating a friction temperature of the starting clutch, a second step of calculating a cooling temperature of the starting clutch, a third step of generating an estimated temperature of the starting clutch by subtracting the cooling temperature of the starting clutch from the friction temperature of the starting clutch, and/or a fourth step of performing an operation for protecting the starting clutch if the estimated temperature of the starting clutch exceeds a predetermined critical temperature.

The method may include, prior to the first step calculating a transmission torque of the starting clutch, calculating a relative speed by determining the difference between an engine speed and a speed of an input shaft, and/or calculating a frictional heat energy of a friction member plate by multiplying the transmission torque of the starting clutch, the relative speed, and a slip control time of the starting clutch.

The first step may include a) multiplying a heat generation efficiency by the frictional heat energy of the friction member plate, b) multiplying a mass of the friction member plate by a specific heat of the friction member plate, c) dividing a result of step a) by a result of step b), and/or d) adding a temperature sensed by an ATF (Automatic Transmission Fluid) sensor to a result of step c).

The second step may include calculating difference between a previous friction temperature of the starting clutch and a temperature sensed by an ATF sensor, and/or multiplying the difference between the previous friction temperature of the starting clutch and the temperature sensed by the ATF sensor, an equivalent convective heat transfer coefficient, and a slip control time.

The equivalent convective heat transfer coefficient may be obtained using the amount of cooling fluid as a variable, and as a function of the amount of cooling fluid.

The function of the amount of cooling fluid may be $\beta = a \times (\text{the amount of cooling fluid})^{w/Duty} + b \times (\text{the amount of cooling fluid})^{x/Duty} + c \times (\text{the amount of cooling fluid})^{y/Duty} + d \times (\text{the amount of cooling fluid})^{z/Duty} + e$, wherein a to e, and w to z indicate constants obtained from experiments, the amount of cooling fluid indicates the amount of cooling fluid that may be forcibly injected to the surface of the starting clutch by a solenoid valve, and Duty indicates an On/Off ratio of current supplied to a solenoid valve that controls the amount of cooling fluid.

The operation for protecting the starting clutch may include an operation for cooling the starting clutch, an operation for compulsorily reducing the slip time of the starting clutch, and an operation for compulsorily releasing the starting clutch.

Another aspect of the present invention is directed to a system including a processor and a memory storing instructions executable by the processor, wherein the processor, when executing the instructions performs a plurality of steps including a first step of calculating a friction temperature of the starting clutch, a second step of calculating a cooling temperature of the starting clutch, a third step of generating an estimated temperature of the starting clutch by subtracting the cooling temperature of the starting clutch from the friction temperature of the starting clutch, and/or a fourth step of performing an operation for protecting the starting clutch if the estimated temperature of the starting clutch exceeds a predetermined critical temperature.

The system may include, prior to the first step calculating a transmission torque of the starting clutch, calculating a relative speed by determining the difference between an engine speed and a speed of an input shaft, and/or calculating a frictional heat energy of a friction member plate by multiplying the transmission torque of the starting clutch, the relative speed, and a slip control time of the starting clutch.

The first step may include a) multiplying a heat generation efficiency by the frictional heat energy of the friction member plate, b) multiplying a mass of the friction member plate by a specific heat of the friction member plate, c) dividing a result of step a) by a result of step b), and/or d) adding a temperature sensed by an ATF sensor to a result of step c).

The second step may include calculating difference between a previous friction temperature of the starting clutch and a temperature sensed by an ATF sensor, and/or multiplying the difference between the previous friction temperature of the starting clutch and the temperature sensed by the ATF sensor, an equivalent convective heat transfer coefficient, and a slip control time.

The equivalent convective heat transfer coefficient may be obtained using the amount of cooling fluid as a variable, and as a function of the amount of cooling fluid.

The function of the amount of cooling fluid may be $\beta = a \times$ (the amount of cooling fluid)$^{w/Duty}$ + $b \times$(the amount of cooling fluid)$^{x/Duty}$ + $c \times$(the amount of cooling fluid)$^{y/Duty}$ + $d \times$(the amount of cooling fluid)$^{z/Duty}$ + $e$, wherein a to e, and w to z indicate constants obtained from experiments, the amount of cooling fluid indicates the amount of cooling fluid that may be forcibly injected to the surface of the starting clutch by a solenoid valve, and Duty indicates an On/Off ratio of current supplied to a solenoid valve that controls the amount of cooling fluid.

The operation for protecting the starting clutch may include an operation for cooling the starting clutch, an operation for compulsorily reducing the slip time of the starting clutch, and an operation for compulsorily releasing the starting clutch.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
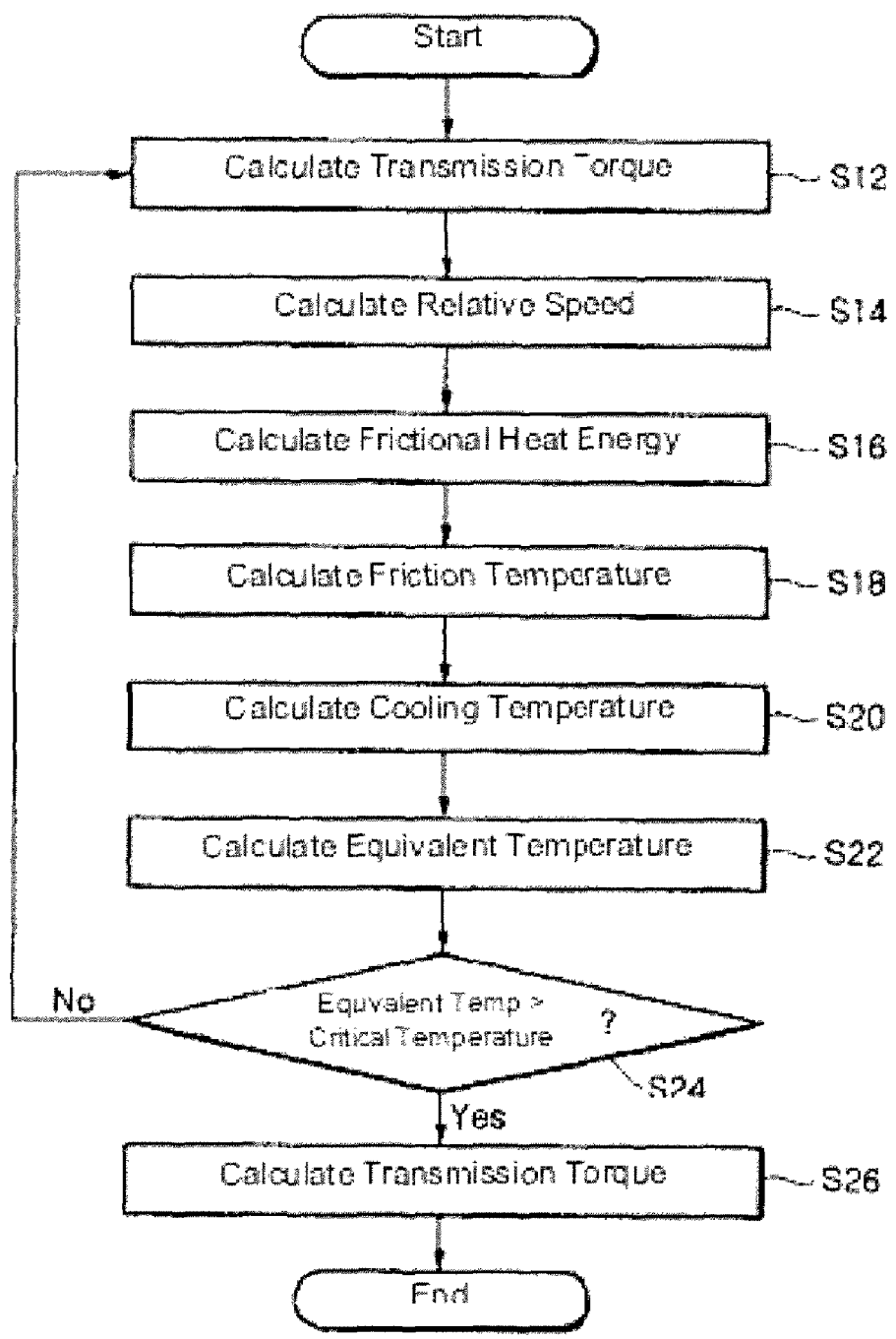
FIG. 1 is a flowchart illustrating an exemplary method of protecting a starting clutch according to the present invention.
Figure 2:
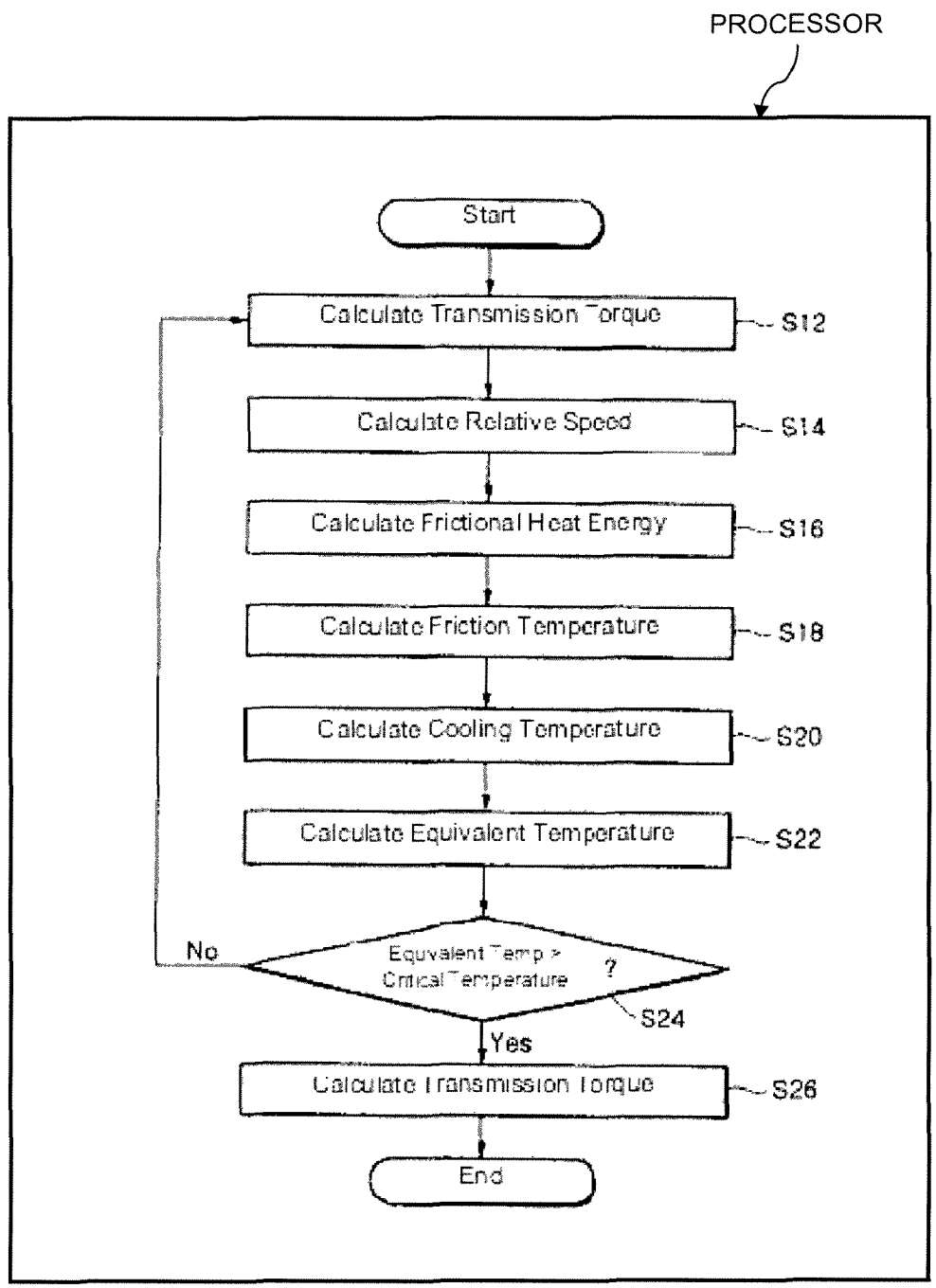
FIG. 2 is a schematic illustration of an exemplary system of protecting a starting clutch according to the present invention.

FIG. 1 is a flowchart illustrating a method of protecting a starting clutch according to various embodiments of the present invention. The methods described herein can be implemented using any conventional electronic control unit or module (see, e.g., FIG. 2). Said control unit may comprise a processor, memory, and associated hardware and software as may be selected and programmed by persons of ordinary skill in the art based on the teachings of the present invention contained herein.

Referring to FIG. 1, a method of protecting a starting clutch according to various embodiments of the present invention calculates the transmission torque Tor(t) of a starting clutch by Equation 1 (S12).

$$Tor(t) = R_m \times F_{tot} \times n \times 2 \times \text{friction coefficient} \quad \text{Equation 1}$$

Here, $R_m$ indicates an effective radius, $F_{tot}$ indicates a piston force, and n indicates the number of friction members.

Further, the method of protecting a starting clutch according to various embodiments of the present invention calculates relative speed $\Delta\omega(t)$ per step (S14), that is, the difference between engine speed and speed of an input shaft.

Subsequently, frictional heat energy E(t) of a friction member plate can be calculated using the following Equation 2 (S16), which requires values for the transmission torque Tor(t) of the starting clutch calculated in Step S12, relative speed $\Delta\omega(t)$ calculated in Step S14, and $\Delta t$.

$$E(t) = Tor(t) \times \Delta\omega(t) \times \Delta t \quad \text{Equation 2 (S16)}$$

Here, $\Delta t$ indicates slip control time of the starting clutch.

Further, friction temperature $T_{heat}(t)$ of the starting clutch can be calculated using the following Equation 3 (S18), which requires values for the frictional heat energy E(t) of the friction member calculated in Step S16, and temperature $T_{ATF}(t)$ as sensed by an ATF (Automatic Transmission Fluid) sensor.

$$T_{heat}(t) = T_{ATF}(t) + \alpha \times E(t)/(m \times C_p) \quad \text{Equation 3 (S18)}$$

Here, $\alpha$ indicates heat generation efficiency, m indicates the mass of the friction members plate, and $C_p$ indicates the specific heat of the friction members plate.

Further, cooling temperature $T_{cool}(t)$ of the starting clutch can be calculated using Equation 4 (S20). Equation 4 uses friction temperature $T_{heat}(t)$ of the starting clutch calculated in Step S18, and temperature $T_{ATF}(t)$ sensed by the ATF sensor, and the amount of cooling fluid that serve as variables, and an equivalent convective heat transfer coefficient $\beta$ that is obtained from an experiment in the form of a function between a duty ratio and the amount of cooling fluid.

$$T_{cool}(t) = \beta \times (T_{heat}(t-1) - T_{ATF}(t)) \times \Delta t_s \quad \text{Equation 4 (S20)}$$

Here, $\Delta t_s$ indicates a calculation cycle or a control cycle of a controller.

The equivalent convective heat transfer coefficient $\beta$ can be calculated using the following Equation 5, which uses the amount of cooling fluid as a variable and is obtainable from experiments in the form of a function between a duty ratio and the amount of cooling fluid.

$$\beta = a \times (\text{the amount of cooling fluid})^{w/Duty} + b \times (\text{the amount of cooling fluid})^{x/Duty} + c \times (\text{the amount of cooling fluid})^{y/Duty} + d \times (\text{the amount of cooling fluid})^{z/Duty} + e \quad \text{Equation 5}$$

Here, a to e, and w to z indicate constants obtained from experiments, the amount of cooling fluid indicates the amount of cooling fluid that is forcibly injected to the surface of the starting clutch by a solenoid valve, and Duty indicates an On/Off ratio of current supplied to a solenoid valve that controls the amount of cooling fluid.

Subsequently, equivalent temperature $T_{clutch\_equal}(t)$ of the starting clutch is calculated using Equation 6, that is, by subtracting the cooling temperature $T_{cool}(t)$ of the starting clutch calculated in Step S20 from the friction temperature $T_{heat}(t)$ of the starting clutch calculated in Step S18.

$$T_{clutch\_equal}(t)=T_{heat}(t)-T_{cool}(t) \quad \text{Equation 6 (S22)}$$

In step (S24), the methods and systems of the present invention determine whether the equivalent temperature $T_{clutch\_equal}(t)$ of the starting clutch exceeds critical temperature (S24). If equivalent temperature $T_{clutch\_equal}(t)$ of the starting clutch exceeds the critical temperature, the method and system of the invention performs an operation for protecting the starting clutch (S26). Said operation for protecting the starting clutch may include, without exclusion, an operation for cooling the starting clutch, an operation for compulsorily reducing the slip time of the starting clutch, an operation for compulsorily releasing the starting clutch, and the like.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of protecting a starting clutch of a vehicle, the method comprising:
   calculating a transmission torque of the starting clutch;
   calculating a relative speed by determining a difference between an engine speed and a speed of an input shaft;
   calculating a frictional heat energy of a friction member plate by multiplying the transmission torque of the starting clutch, the relative speed, and a slip control time of the starting clutch;
   calculating a friction temperature of the starting clutch;
   calculating a cooling temperature of the starting clutch;
   generating an estimated equivalent temperature of the starting clutch by subtracting the cooling temperature of the starting clutch from the friction temperature of the starting clutch; and
   performing an operation for protecting the starting clutch if the estimated equivalent temperature of the starting clutch exceeds a predetermined critical temperature.

2. The method as defined in claim 1, wherein calculating a friction temperature includes:
   a) multiplying a heat generation efficiency by the frictional heat energy of the friction member plate;
   b) multiplying a mass of the friction member plate by a specific heat of the friction member plate;
   c) dividing a result of step a) by a result of step b); and
   d) adding a temperature sensed by an ATF (Automatic Transmission Fluid) sensor to a result of step c).

3. The method as defined in claim 1, wherein the operation for protecting the starting clutch includes an operation for cooling the starting clutch, an operation for compulsorily reducing the slip time of the starting clutch, and an operation for compulsorily releasing the starting clutch.

4. A method of protecting a starting clutch of a vehicle, the method comprising:
   calculating a friction temperature of the starting clutch;
   calculating a cooling temperature of the starting clutch;
   generating an estimated equivalent temperature of the starting clutch by subtracting the cooling temperature of the starting clutch from the friction temperature of the starting clutch; and
   performing an operation for protecting the starting clutch if the estimated equivalent temperature of the starting clutch exceeds a predetermined critical temperature; and
   wherein calculating a friction temperature comprises:
      calculating a difference between a previous friction temperature of the starting clutch and a temperature sensed by an ATF (Automatic Transmission Fluid) sensor; and
      multiplying the difference between the previous friction temperature of the starting clutch and the temperature sensed by the ATF sensor, an equivalent convective heat transfer coefficient, and a slip control time.

5. The method as defined in claim 4, wherein the equivalent convective heat transfer coefficient is obtained using the amount of cooling fluid as a variable, and as a function of the amount of cooling fluid.

6. The method as defined in claim 5, wherein the function of the amount of cooling fluid is as follows:
   $\beta = a \times (\text{the amount of cooling fluid})^{w/Duty} + b \times (\text{the amount of cooling fluid})^{x/Duty} + c \times (\text{the amount of cooling fluid})^{y/Duty} + d \times (\text{the amount of cooling fluid})^{z/Duty} + e$;
   wherein a to e, and w to z indicate constants obtained from experiments, the amount of cooling fluid indicates the amount of cooling fluid that is forcibly injected to the surface of the starting clutch by a solenoid valve, and Duty indicates an On/Off ratio of current supplied to a solenoid valve that controls the amount of cooling fluid.

7. A system including a processor and memory storing instructions executable by the processor, wherein the processor, when executing the instructions performs a plurality of steps comprising:
   calculating a transmission torque of the starting clutch;
   calculating a relative speed by determining a difference between an engine speed and a speed of an input shaft;
   calculating a frictional heat energy of a friction member plate by multiplying the transmission torque of the starting clutch, the relative speed, and a slip control time of the starting clutch:
   calculating a friction temperature of the starting clutch;
   calculating a cooling temperature of the starting clutch;
   generating an estimated equivalent temperature of the starting clutch by subtracting the cooling temperature of the starting clutch from the friction temperature of the starting clutch; and
   performing an operation for protecting the starting clutch if the estimated equivalent temperature of the starting clutch exceeds a predetermined critical temperature.

8. The system as defined in claim 7, wherein calculating a friction temperature comprises:
   a) multiplying a heat generation efficiency by the frictional heat energy of the friction member plate;

b) multiplying a mass of the friction member plate by a specific heat of the friction member plate;
c) dividing a result of step a) by a result of step b); and
d) adding a temperature sensed by an ATF (Automatic Transmission Fluid) sensor to a result of step c).

9. The system as defined in claim 7, wherein calculating a friction temperature of the starting clutch comprises:
   calculating a difference between a previous friction temperature of the starting clutch and a temperature sensed by an ATF sensor; and
   multiplying the difference between the previous friction temperature of the starting clutch and the temperature sensed by the ATF (Automatic Transmission Fluid) sensor, an equivalent convective heat transfer coefficient, and a slip control time.

10. The system as defined in claim 9, wherein the equivalent convective heat transfer coefficient is obtained using the amount of cooling fluid as a variable, and as a function of the amount of cooling fluid.

11. The system as defined in claim 10, wherein the function of the amount of cooling fluid is as follows:
   $\beta = a \times $(the amount of cooling fluid)$^{w/Duty} + b \times $(the amount of cooling fluid)$^{x/Duty} + c \times $(the amount of cooling fluid)$^{y/Duty} + d \times $(the amount of cooling fluid)$^{z/Duty} + e$;
   wherein a to e, and w to z indicate constants obtained from experiments, the amount of cooling fluid indicates the amount of cooling fluid that is forcibly injected to the surface of the starting clutch by a solenoid valve, and Duty indicates an On/Off ratio of current supplied to a solenoid valve that controls the amount of cooling fluid.

12. The system as defined in claim 7, wherein the operation for protecting the starting clutch includes an operation for cooling the starting clutch, an operation for compulsorily reducing the slip time of the starting clutch, and an operation for compulsorily releasing the starting clutch.

* * * * *